No. 723,393. PATENTED MAR. 24, 1903.
P. W. KENNY.
REAPING AND MOWING MACHINE.
APPLICATION FILED OCT. 15, 1902.

NO MODEL.

WITNESSES:
Marc A. Guigou.
J. B. Clautice

INVENTOR
Patrick W. Kenny
BY
Thomas Drew Stetson
ATTORNEY

UNITED STATES PATENT OFFICE.

PATRICK WILLIAMS KENNY, OF WATERFORD, IRELAND.

REAPING AND MOWING MACHINE.

SPECIFICATION forming part of Letters Patent No. 723,393, dated March 24, 1903.

Application filed October 15, 1902. Serial No. 127,324. (No model.)

*To all whom it may concern:*

Be it known that I, PATRICK WILLIAMS KENNY, a subject of the King of Great Britain and Ireland, residing at Kingsmeadow House, Waterford, in the county of Waterford, Ireland, have invented a certain new and useful Improvement in Reaping and Mowing Machines, of which the following is a specification.

This invention relates to a new and useful improvement in reaping and mowing machines whereby the stalks of lodged or laid grain are raised before contact with the knife into an upright or partly-upright position and cut in an even and regular manner.

The nature and action of my invention will be readily understood on reference to the accompanying drawings, in which—

Figure 1:
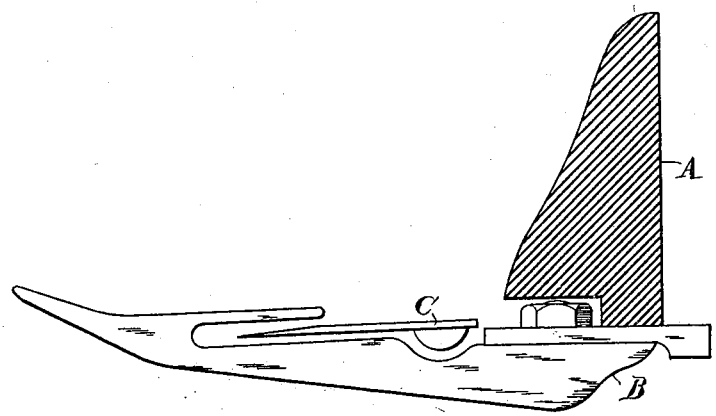
Figure 2:
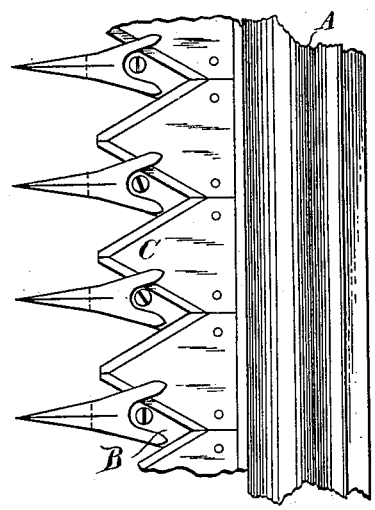
Figure 4:
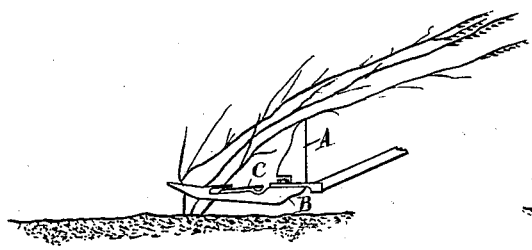
Figure 3:

Figure 1 is a cross-section of an ordinary knife-board with my improvement attached thereto. Fig. 2 is a plan of the same. Fig. 3 illustrates (reduced scale) the action of my improvement as the knife approaches the lodged or laid grain. Fig. 4 shows the action at the moment of contact with the knife.

Similar letters of reference indicate corresponding parts in all the figures where they appear.

A is the tilting bar constituting my improvement, which is of triangular or more or less rounded cross-section, the object being to present an incline in the direction in which the machine moves arranged to lift the grain. This bar A, which may be about three and a half inches high and one and a half inches wide at the base, (more or less,) extends along above the knife-board or finger-bar B in close proximity to the back of the knives C and is fixed to the frame by bolts, clamps, or other suitable means.

The action of my invention is as follows: As the machine travels forward the front surface of the bar meeting the lodged or laid stalks, Fig. 3, gradually tilts them into an upright or nearly-upright position, Fig. 4, as the knife comes in contact therewith. The grain-stalks are consequently operated upon in an effective and regular manner and cut close to the ground.

Among the advantages of my invention may be mentioned, first, it prevents the chopping off of the heads of grain, since it lifts the stalks bodily as the knife approaches; second, it obviates the necessity of dropping the finger-points, which causes inconvenience and frequently injures the knives, especially when moving over uneven ground; third, it enables the sheaves to be made more compact and the heads to be brought more evenly together; fourth, it is a simple contrivance and does not materially increase the weight or cause extra strain on the machine; fifth, it is inexpensive, readily adjusted, and can be easily fitted to existing machines.

It is obvious that a simple board arranged at a suitable angle, so as to present an inclined plane, might fulfil the object of my invention; but I prefer a bar of substantially triangular section, such as I have herein described.

I claim as my invention—

1. In a reaping and mowing machine, in combination with the cutting mechanism, a horizontal bar A lying close above the finger-bar and presenting an upwardly and rearwardly inclined face, from bottom to top, whereby it is adapted to serve substantially as herein specified.

2. In a reaping and mowing machine, in combination with the cutting mechanism, a bar A substantially triangular in cross-section, firmly secured by one of its faces extending across close above the finger-bar and presenting an upwardly and rearwardly inclined face, whereby it is adapted to serve substantially as herein specified.

In testimony whereof I have signed my name to this specification in the presence of two subscribing witnesses.

PATRICK WILLIAMS KENNY.

Witnesses:
JAMES PALMER,
ANDREW ROGERS.